(12) United States Patent
Ervin et al.

(10) Patent No.: US 6,438,133 B1
(45) Date of Patent: Aug. 20, 2002

(54) LOAD BALANCING MECHANISM FOR A TRANSLATIONAL BRIDGE ENVIRONMENT

(75) Inventors: Jimmy Philip Ervin; Richard Colbert Matlack, Jr., both of Raleigh; Pramod Narottambhai Patel, Cary; Deepak Vig, Raleigh, all of NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/149,908

(22) Filed: Sep. 9, 1998

(51) Int. Cl.[7] ............................................. H04L 12/46
(52) U.S. Cl. ...................... 370/403; 370/465; 370/475; 709/242; 709/245
(58) Field of Search ................................ 370/352, 252, 370/248, 401–405, 400, 463, 465, 466, 475; 709/223, 224, 225, 229, 232, 238, 242, 245, 249, 253

(56) References Cited

U.S. PATENT DOCUMENTS

| | | | | |
|---|---|---|---|---|
| 5,088,090 A | * | 2/1992 | Yacoby | 370/256 |
| 5,214,646 A | * | 5/1993 | Yacoby | 370/402 |
| 5,280,480 A | | 1/1994 | Pitt et al. | 370/85.13 |
| 5,327,431 A | * | 7/1994 | Heske et al. | 370/403 |
| 5,434,976 A | | 7/1995 | Tan et al. | 395/200 |
| 5,444,692 A | | 8/1995 | Basso et al. | 370/13 |
| 5,448,565 A | * | 9/1995 | Chang et al. | 340/825.52 |
| 5,590,285 A | | 12/1996 | Krause et al. | 395/200.2 |
| 5,600,798 A | * | 2/1997 | Cherukuri et al. | 370/230 |
| 5,655,140 A | | 8/1997 | Haddock | 395/200.76 |
| 5,734,824 A | * | 3/1998 | Choi | 370/254 |
| 6,137,797 A | * | 10/2000 | Bass et al. | 370/392 |

OTHER PUBLICATIONS

IBM Technical Disclosure Bulletin, vol. 38, No. 09, Sep. 1995 "Algorithm for Multiport Source Routing to Transparent Bridging LAN Bridge".

IBM Technical Disclosure Bulletin, vol. 38, No. 11, Nov. 1995 "Protocol for Seamless Mobility Transitions in Transparent Bridging Local Area Networks".

* cited by examiner

Primary Examiner—Ricky Ngo
(74) Attorney, Agent, or Firm—Cesari & McKenna, LLP (57) ABSTRACT

Mechanism for use in an internetworking device incorporating a translational bridging function to provide load balancing across multiple instances of the same destination address. Traffic originating with clients in the transparently bridged domain is distributed over multiple communication paths to the multiple instances of the destination address in the source route bridging domain. The internetworking device sends an explorer frame over each interface in the source route bridging domain to discover all parallel paths to the destination address. The internetworking device receives a response from each instance of the destination address over all possible paths. The routing information contained in the responses is used to create entries in a cache in the internetworking device. Load balancing is performed by using the source address of the transparently bridged clients as a key to select a specific path for each such client. Frames originating with different clients in the transparent bridging domain are then distributed over the selected paths to the same destination address.

29 Claims, 7 Drawing Sheets

LOAD BALANCING MECHANISM FOR A TRANSLATIONAL BRIDGE ENVIRONMENT

BACKGROUND OF THE INVENTION

The present invention relates in general to an improved data communication and networking system, and in particular, to an improved system and method for conveying data between a transparent bridging domain and a source route bridging domain.

The prior art provides two bridging architectures that can be used to interconnect local area networks (LANs). Both the source route bridging (SRB) architecture and the transparent bridging (TB) architecture are well-known in the prior art and will only be described briefly here to describe the environment in which the invention is used.

In the source route bridging architecture, the specific route which a frame must traverse between a source end station (host) and a destination end station (host) is carried in the frame. SRBs are so-named because the complete source-to-destination route is placed in all inter-LAN frames sent by the source station. SRBs store and forward the frames as indicated by the route appearing in the appropriate field of the frame. Before the frame is transmitted with routing information, the source station sends an explorer frame which is propagated throughout the network to the destination station. As the explorer frame traverses the network, a source route bridge interconnecting LANs enters routing information in the frame such as bridge identification number, LAN number, etc. When the explorer frame arrives at the destination end station, it is copied and then rerouted by the specific route entered into the frame to the source end station. The source end station stores the route information and uses it to send subsequent frames to the destination end station. A more detailed description of the source routing architecture is contained in the IEEE 802.5 token ring LAN specification.

In the transparent bridging architecture, routing information is not carried in the frame. Transparent bridges are so-named because their presence and operation is transparent to network hosts. When transparent bridges are powered on, they learn the topology of the network by analyzing the source address of incoming frames from all attached LANs. When a transparent bridge receives a frame from a host on an interface (port), it concludes that the host can be reached through the LAN connected to that port. The transparent bridge uses this process to build a table containing the host address and the interface number. When a source station on one LAN intends to communicate with a destination end station on another LAN, the transparent bridge compares the destination address with the entries in the transparent bridge table. If the table contains an association between the destination address and any of the bridge's ports except the one on which the frame was received, the frame is forwarded out the indicated port. If no association is found, the frame is flooded to all ports except the port on which it was received. Broadcast frames and multicast frames are flooded in the same way. A more detailed description of the transparent bridging architecture is contained in the IEEE 802.1 standard.

Transparent bridges are found predominantly in Ethernet IEEE 802.3 networks and source route bridges are found almost exclusively in token ring networks. Translational bridges are designed to bridge between a transparent bridging domain and a source route bridging domain in a bridged heterogeneous communications network. Translational bridging has not been standardized by organizations such as the IEEE, with the result that many aspects of translational bridging have been left to the product vendor implementing this function. IBM introduced source route transparent (SRT) bridging as an alternative to translational bridging in a heterogeneous bridging environment. SRT bridges can forward traffic from both transparent and source route end stations and form a common spanning tree with transparent bridges, allowing end stations of each type to communicate with end stations of the same type in a network of arbitrary topology. U.S. Pat. No. 5,280,480 teaches source route transparent bridging and is hereby incorporated by reference.

Ultimately, the goal of connecting a transparent bridging domain and a source route bridging domain is to allow communication between hosts in the transparent bridging domain and hosts in the source route bridging domain. Ethernet and token ring LANs both support 48 bit media access control (MAC) addresses, although the internal hardware representation of these addresses differ. Although MAC addresses are unique for Ethernet devices, the token ring protocol allows duplicate MAC addresses, that is, stations on different token rings can have the same token ring MAC address. The problem specifically addressed by the invention is that of distributing traffic originating at different hosts in the transparent bridging domain along different routes to a destination address in the source route bridging domain when there are multiple instances of the destination address.

SUMMARY OF THE INVENTION

It is therefore one object of this invention to provide an improved data communication and networking system in a mixed bridging environment.

It is another object of this invention to provide a method for distributing traffic originating from hosts in a transparent bridging environment along multiple communications paths to a destination MAC address.

It is another object of the invention to provide an improved translational bridge that supports multiple active communication paths for multiple instances of the destination MAC address in the source route bridging network.

The foregoing objects are achieved by the method and system of the present invention which provides a mechanism that allows translational bridges connecting transparently bridged networks to source route bridged networks to support multiple communication paths for multiple instances of the MAC address in the SRB network.

Specifically, the invention allows traffic from transparently bridged clients destined to a MAC address on the SRB network on the other side of the translational bridge to be distributed across multiple instances of the same MAC address. The translational bridge sends a spanning tree explorer (STE) frame if the destination MAC address has not been learned. This ensures that the parallel paths to the destination MAC address are discovered. The STE frame is delivered once to each ring in the SRB network. The translational bridge receives a response from the destination MAC over each ring with corresponding routing information fields (RIFs) which are then cached. The translational bridge then distributes traffic destined to this MAC address across the different RIFs. Load balancing is performed by using the MAC address of the source as the key, i.e., frames from each transparently bridged client to the same destination MAC address can be distributed over separate RIFs.

BRIEF DESCRIPTION OF THE DRAWINGS

The novel feature believed characteristic of the present invention are set forth in the appended claims. The invention itself however, as well as a preferred mode of use, further objects and advantages thereof, will be best understood by reference to the following detailed description of an illustrative embodiment when read in conjunction with the accompanying drawings, wherein:

DETAILED DESCRIPTION OF THE PREFERRED EMBODIMENT

Translational bridges allow end stations from an Ethernet/transparent bridging domain to communicate with end stations from the token ring/source route bridging domain. Translational bridges create a gateway between the two domains. To the SRB end station, the translational bridge has a ring number and bridge number associated with it, and thus looks like a standard SRB. The ring number, in this case, actually reflects the entire transparent bridging domain. To the transparent bridging domain, the translational bridge is simply another transparent bridge.

Figure 1:
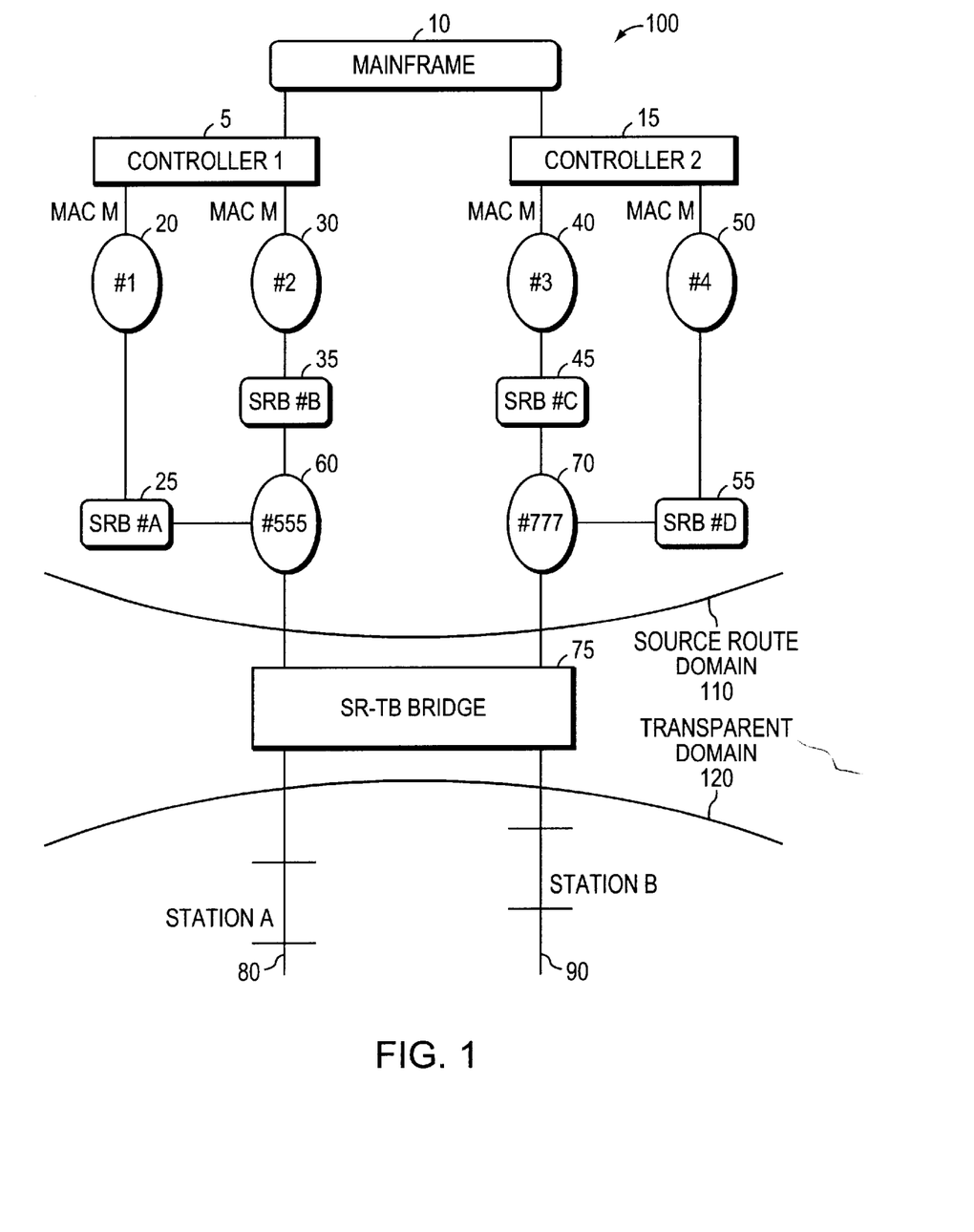
FIG. 1 illustrates a source routing-transparent (translational) bridge in which the present invention operates.

FIG. 1 illustrates a computer network 100 having both a source route bridging domain 110 and a transparent bridging domain 120. The two domains are interconnected by source routing-transparent (translational) bridge 75. In the source route bridging domain 110 of the network 100, there is depicted a mainframe computer 10 (e.g. IBM S/390) to which is connected communications controller 5 and communications controller 15. Controller 5 has connections to token ring LANs 20 and 30; controller 15 has connections to token ring LANs 40 and 50. Source route bridge 25 connects token ring LAN 20 to token ring LAN 60. Likewise, source route bridge 35 connects token ring LAN 30 to token ring LAN 60; source route bridge 45 connects token ring LAN 40 to token ring LAN 70; and source route bridge 55 connects token ring LAN 50 to token ring LAN 70. Source routing-transparent (translational) bridge 75 connects to token ring LANs 60, 70 in the source route bridging domain 110 and to LAN segments 80 and 90 in the transparent bridging domains 120. Also, depicted in FIG. 1 is station A on Ethernet LAN segment 80 and station B on Ethernet LAN segment 90.

In the source route bridging domain 110, when a source host on one token ring LAN wants to communicate with a destination host on another token ring LAN, the source host sends an explorer frame to each SRB to which the first LAN is connected. Each SRB receiving the explorer frame copies the frame onto all of its outbound ports. Route information is added to the explorer frames as they traverse the inter-network. When the explorer frames from the source host reach the destination host, the destination host replies to each explorer frame individually using the accumulated route information. The source host chooses a path based on some predetermined criteria such as the first frame received, or the path with the fewest hops. The IEEE 802.5 specification does not require any particular criteria. Generally, the first frame received will determine the path chosen. After the route is selected, it is inserted into frames destined for the destination host in the form of a routing information field (RIF). A RIF is included only in those frames destined for other LANs. The presence of routing information within the frame is indicated by setting of the most significant bit within the source address field, called the routing information indicator (RII) bit.

Figure 2:
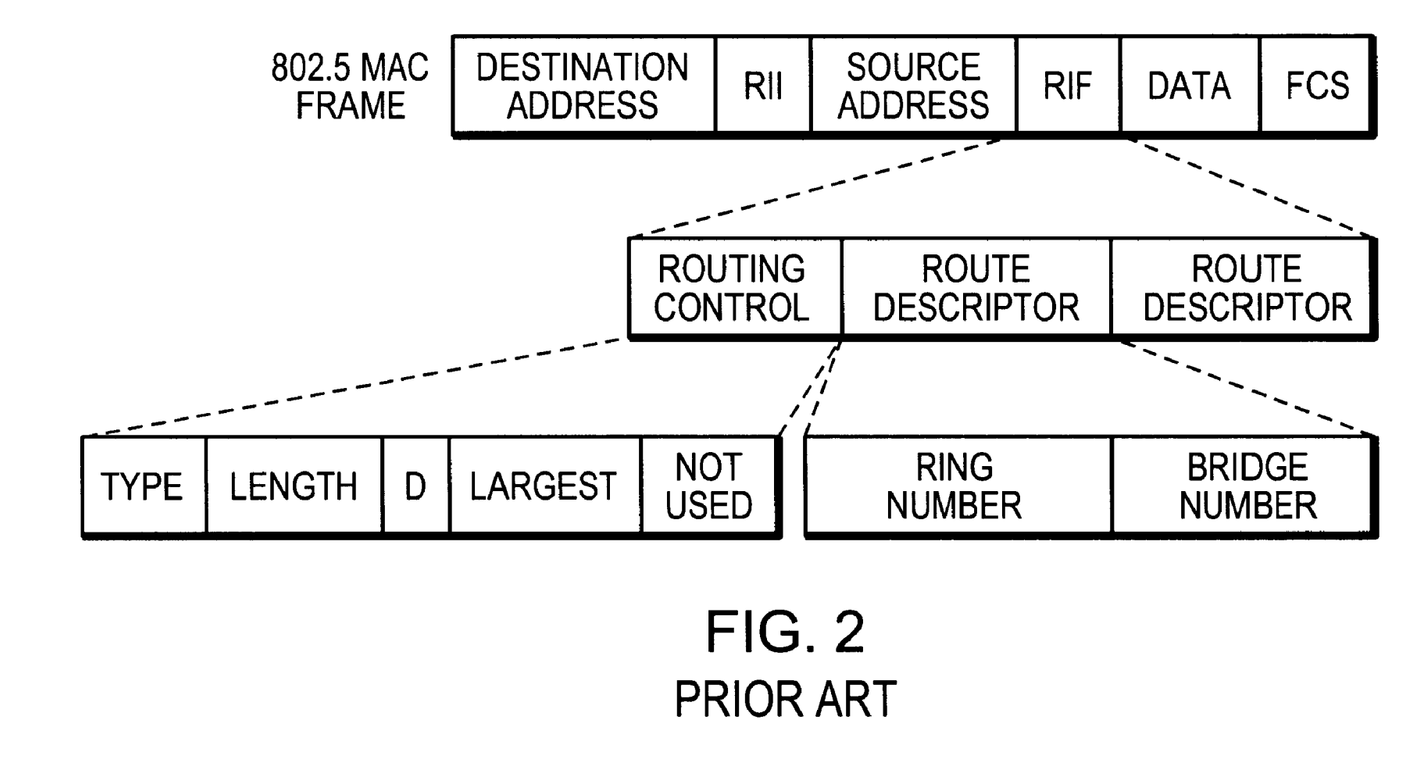
FIG. 2 illustrates the format of a token ring frame according to the IEEE 802.5 specification.

FIG. 2 illustrates the format of an IEEE 802.5 token ring frame, and more particularly, the format of the routing information field (RIF). The fields of the RIF are as follows:

a. the routing control field, which consists of the following subfields:

(1) the type subfield in the RIF indicates whether the frame should be routed to a single node, a group of nodes that make up a spanning tree of the internetwork, or all nodes. The first type is called a specifically routed frame; the second type is called a spanning-tree explorer; and the third type is called an all-paths explorer.

The spanning-tree explorer can be used as a transit mechanism for multicast frames. It can also be used as a replacement for the all-paths explorer in outbound route queries. In this case, the destination responds with an all-paths explorer.

(2) the length subfield indicates the total length (in bytes) of the RIF.

(3) the D bit indicates the direction of the frame (forward or reverse).

(4) the largest field indicates the largest frame that can be handled along this route.

b. the route descriptor field, of which there can be more than one. Each route descriptor field carries a ring number-bridge number pair that specifies a portion of a route. Routes, then, are simply alternating sequences of LAN and bridge numbers that start and end with LAN numbers.

When bridging from the SRB domain 110 to the transparent bridging domain 120, SRB information is removed. RIFs are usually cached in the translational bridge 75 for use by subsequent traffic. When bridging from the transparent bridging domain 120 to the SRB domain 110, translational bridge 75 checks the frame to determine if it has a unicast destination. If the frame has broadcast or multicast destinations, the frame is sent into the SRB domain 110 as a spanning tree explorer frame. If the frame has a unicast destination address, translational bridge 75 looks up the destination in its RIF cache. If it is found in the cache, the RIF information is added to the frame; otherwise the frame is sent as a spanning tree explorer frame.

Two key features of source route bridging are utilized in the present invention. The first feature of source route bridging is that it supports multiple communication paths between a source station on one token ring LAN and a destination station on a different token ring LAN. These paths can be in use concurrently, thus providing load balancing in the SRB network. The second feature of source route bridging is that it allows stations on different token ring LANs to have the same token ring MAC address. This feature is used extensively by mainframe controllers across multiple interfaces to distribute incoming traffic over multiple token ring connections within a controller as well as to multiple controllers all sharing the same MAC address. This allows mainframe access to be load balanced. Thus, as illustrated in FIG. 1, controller 5 has the same MAC address (MAC M) for its connections to token ring LAN 20 and token ring LAN 30. The same is true for controller 15 and its connections to token ring LAN 40 and token LAN 50. As depicted in FIG. 1, there are four parallel paths to the mainframe 10, each terminating in the same MAC address (i.e., MAC M). In a transparent bridging domain, on the other hand, stations on different LAN segments must have a unique MAC address. Thus load balancing that is possible at the MAC address level with token ring networks in the SRB domain is not possible with Ethernet networks using transparent bridging. Consequently, translational bridges that are available in the prior art do not support multiple active communication paths for multiple instances of MAC addresses in the SRB domain. The present invention described more fully herein provides load balanced mainframe access for Ethernet clients in the transparent bridging domain. It allows traffic from Ethernet clients destined to a MAC address in the SRB network to be distributed across multiple instances of the MAC address (e.g. MAC M).

In the network 100 depicted in FIG. 1, station A on Ethernet LAN 80 is unaware of the SRB network 110 on the other side of the translational bridge 75. Station A sends a frame to the MAC address MAC M of the mainframe controllers 5, 15. The translational bridge 75 must decide which MAC M to forward this frame to. Normally, if translational bridge 75 has not learned a path to the destination (MAC M), it sends the frame over the SRB network as an explorer frame, preferably a spanning tree explorer (STE) frame. The STE frame is delivered once to each ring in the SRB network 110. When the destination (MAC M) responds, the translational bridge 75 learns the path to the destination from the routing information field (RIF) in the response frame. In the network depicted in FIG. 1, translational bridge 75 receives four responses with the corresponding RIFs:

RIF-1: Ring #1, SRB#A, Ring #555
RIF-2: Ring #2, SRB#B, Ring #555
RIF-3: Ring #3, SRB#C, Ring #777
RIF-4: Ring #4, SRB#D, Ring #777

Prior art translational bridges associate MAC M with one of the four RIFs. Thereafter, any frame from a station on Ethernet network 120 is sent using the selected RIF. Thus the other MAC M interfaces will never be used with prior art translational bridges. Furthermore, prior art translational bridges will age out the cache entry for MAC M if it does not see any frames from MAC M for a period of time. Therefore, if the selected RIF to MAC M fails due to the failure of a ring or a SRB in the path, the translational bridge will not receive any frames having the RIF and the cache entry for MAC M will be aged out. On the next transmit to MAC M, the prior art translational bridge sends an STE explorer frame to find a new RIF. Even when a new RIF is found, the Ethernet clients (station A, for example) experience a session timeout.

With the present invention, translational bridge 75 sends an explorer frame to the destination MAC address if the destination MAC address has not been learned. This ensures that parallel paths to the destination MAC address are learned. Translational bridge 75 caches all RIFs that are seen from a MAC address, i.e., all 4 RIFs received in the network of FIG. 1. The translational bridge 75 subsequently distributes traffic to the destination MAC address across the different RIFs. The load distribution to different RIFs can be done in various ways; however, in the preferred embodiment distribution is performed by using the MAC address of the source station as the key. One possibility is to use the low order bits of the source MAC address as an index to select from the multiple RIFs. Another scheme is to perform an exclusive OR operation between the highest order two bytes and the lowest order two bytes of the six byte source address. The result of this operation is then combined with the middle bytes of the source address in another exclusive OR operation. The low order bits of the final value of this simple hashing scheme is then used as an index to select the RIF to be used. In the network of FIG. 1, frames from station A to MAC M can be sent via RIF-1 (Ring #1, SRB #A, Ring #555), while frames from station B can be sent via RIF-4 (Ring #4, SRB #D, Ring #777).

Translational bridge 75 also maintains an independent age out mechanism for each RIF corresponding to a destination MAC address. The structure used for entries in this duplicate

```
MAC (DMAC) database is as follows:
    typedef struct dmac_entry{
    struct dmac_entry * next;
        byte    source_MAC [6];
        byte    destination_MAC[6];
        integer rif_no;
    }DMAC_CACHE_ent;
```

If a RIF fails due to the failure of a ring or SRB, the translational bridge 75 detects this in the usual manner and ages out the RIF for the destination MAC address. However, when sending the next frame to the destination MAC address, the translational bridge 75 will use an alternate RIF, if one has been learned. As before, switching to a different RIF causes a session timeout for the Ethernet clients in the transparent bridge domain 120. If the failed RIF recovers, traffic can be left on the alternate RIFs to avoid additional session timeouts for existing clients, or the traffic can be switched back to the original RIF to maximize load balancing.

The algorithm implemented in the software logic stored in the translational bridge device is depicted in FIGS. 3–6 as more fully described herein.

Figure 3:
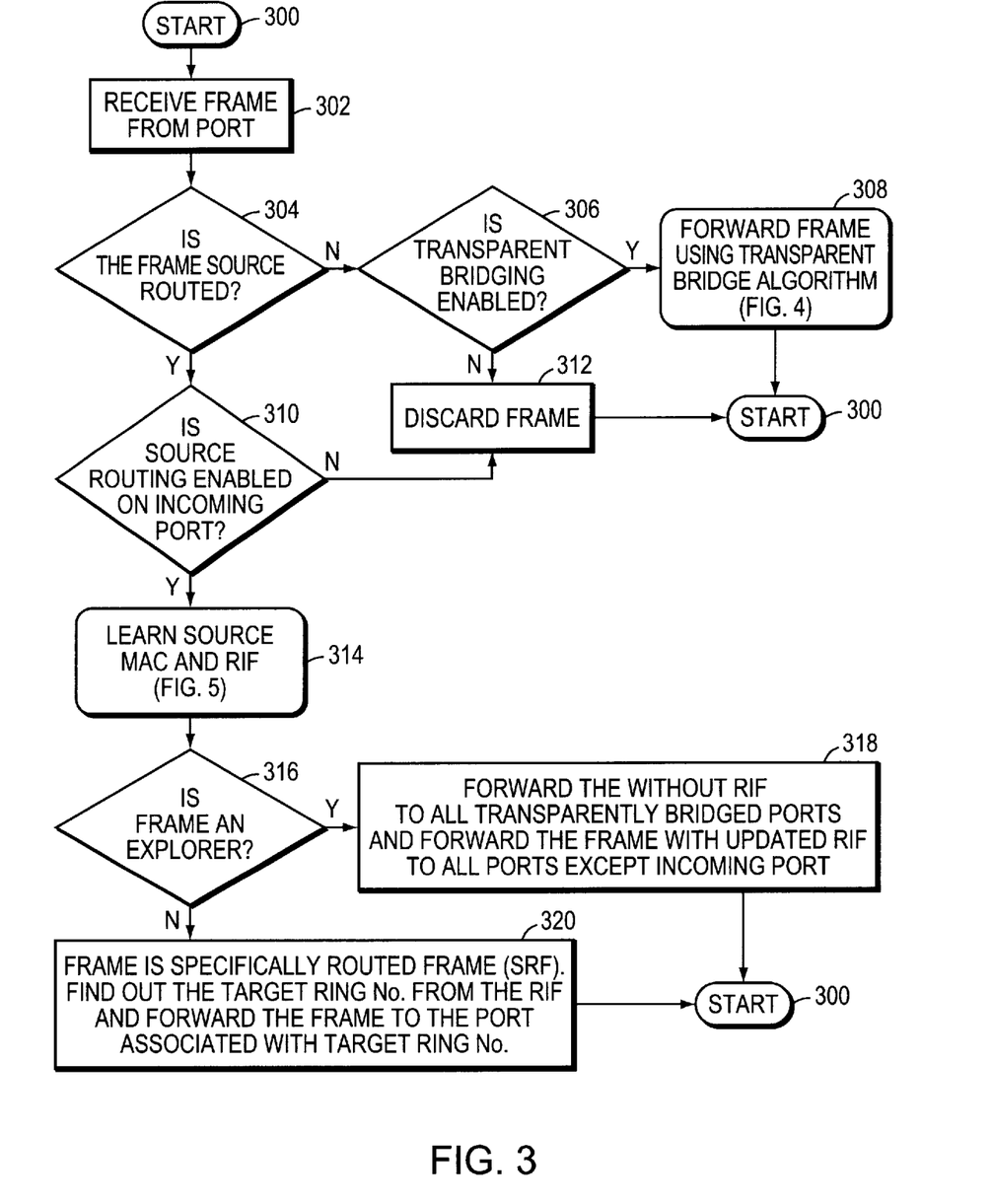
FIG. 3 illustrates the logic steps performed by the source routing-transparent (translational) bridge upon receipt of a frame at a bridge interface.

FIG. 3 illustrates logic steps performed by the translational bridging device of this invention when the device receives a frame on one of its interfaces. Logic step 300 indicates the start of the process. In logic block 302, a frame is received on one port of the translational bridge. In decision block 304, a test is made to determine if the frame is source routed. If the frame is not source routed, a test is performed in decision block 306 to determine if transparent bridging is enabled. If transparent bridging is not enabled, the frame is discarded as indicated in logic block 312. Otherwise, the frame is forwarded using the transparent bridging algorithm as indicated in logic block 308. Processing then passes to the transparent bridging algorithm depicted in FIG. 4.

If in decision block 304, it was determined that the frame is source routed, a test is then made in decision block 310 to determine if source routing is enabled on the incoming port. If it is not, the frame is discarded as indicated by logic block 312. If source routing is enabled on the incoming port, the next step (logic block 314) is to learn the source MAC address and RIF in the source route database maintained in the translational bridge device. The processing associated with logic block 314 is more fully shown in FIG. 5. At the exit from the processing depicted in FIG. 5 (block 510), logic processing returns to decision block 316 wherein a determination is made if the frame is an explorer frame. If it is an explorer frame, then in logic block 318 the frame is forwarded without a RIF to all transparently bridged ports and with an updated RIF to all source routed ports except the incoming port. If it is not an explorer frame, then the frame is a specifically routed frame (SRF). In logic block 320, the target ring number is identified from the RIF in the frame, and the frame is forwarded to the outbound port associated with the target ring number. Processing then returns to logic block 300 to await the arrival of the next frame.

Figure 4:
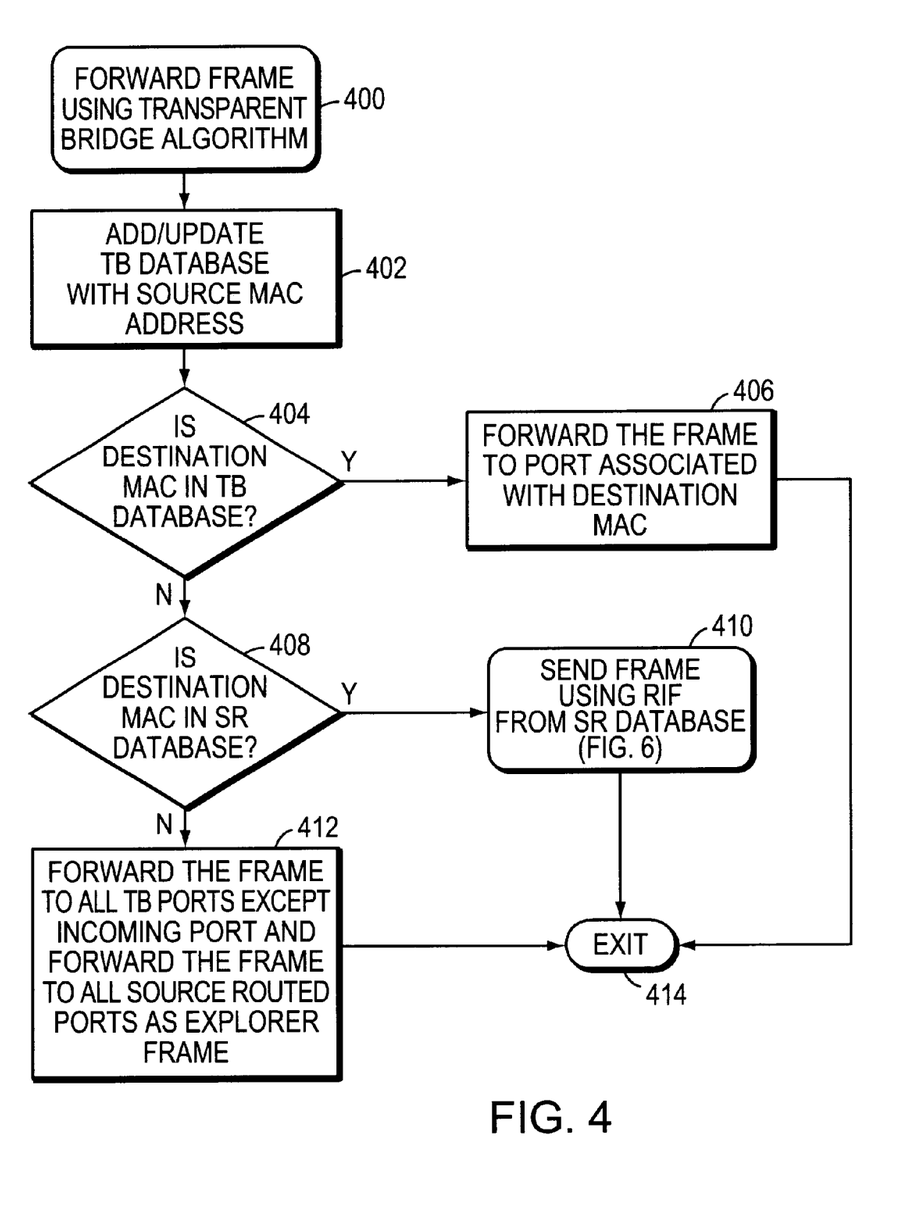
FIG. 4 illustrates the logic steps performed by the source routing-transparent (translational) bridge to forward a frame using the transparent bridge algorithm.

FIG. 4 illustrates the processing performed by the translational bridge to forward a frame using the transparent bridge algorithm. Logic block 400 indicates the start of the algorithm. In logic block 402, the transparent bridging database is updated with the source MAC address contained in the frame. Next, in decision block 404 a test is made to determine if the destination MAC address is in the transparent bridging database. If it is, then the frame is forwarded to the port associated with the destination MAC address as indicated in logic block 406. Processing then exits at logic block 414 which causes a return to logic block 300 to await another frame.

If in decision block 404, the destination MAC address was not found in the transparent bridging database, a test is then made in decision block 408 to determine if the destination MAC address is in the source route database. If it is, then the frame is sent using the RIF from the source route database as indicated in logic block 410. The processing associated with logic block 410 is more fully described in FIG. 6. If the destination MAC address is not in the source route database (decision block 408), processing then proceeds to logic step 412 wherein the frame is forwarded to all transparently bridged ports except the incoming port, and also is forwarded to all source routed ports as an explorer frame. Processing then exits in logic step 404 which causes a return to logic block 300 to await another frame.

Figure 5:
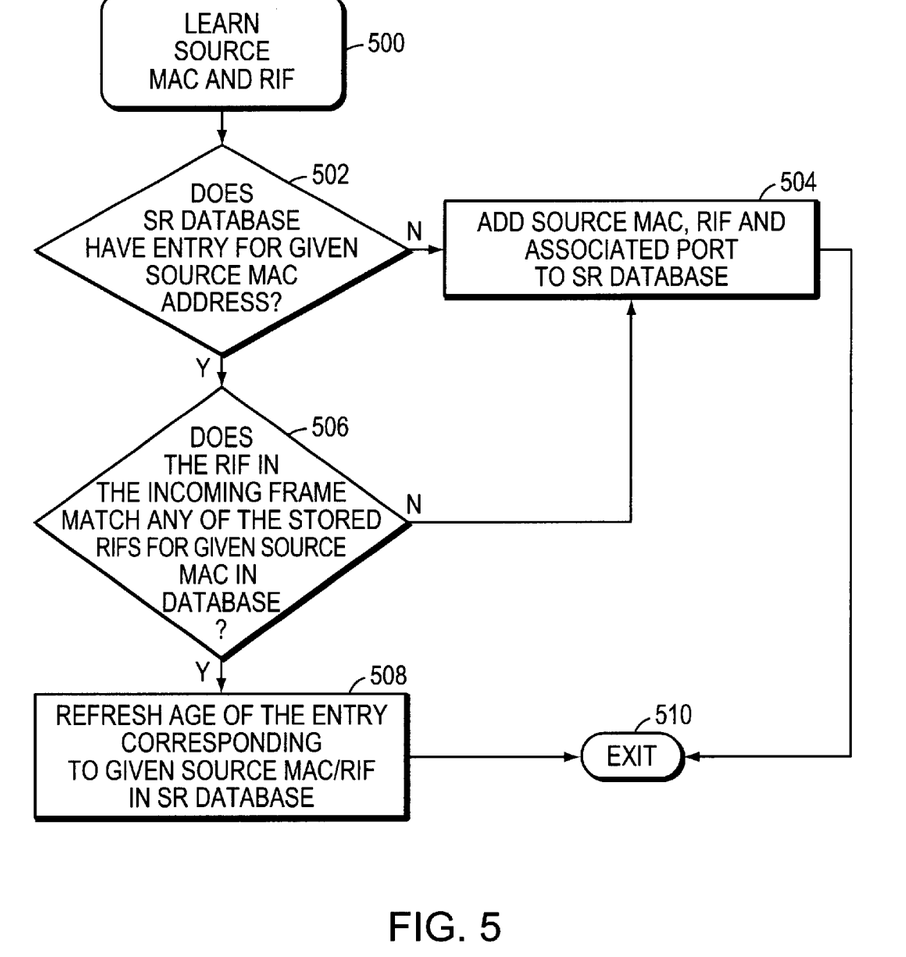
FIG. 5 illustrates the logic steps performed by the source routing-transparent (translational) bridge to learn the source media access control (MAC) address and associated routing information field (RIF)

FIG. 5 illustrates the processing performed by the translational bridge to learn the source MAC address and RIF. Processing starts in logic block 500. In decision block 502, a test is made to determine if the source route database has an entry for the given source MAC address. If no entry is found, then in logic block 504, the source MAC address, RIF and associated port are added to the source route database. This is followed by an exit as indicated in logic block 510, which returns processing to decision block 316 in FIG. 3.

If the source route database does have an entry for the given source MAC address, then in decision block 506, a test is made to determine if the RIF in the incoming frame matches any of the stored RIFs for a given source MAC address in the source route database. If it does not, then the source MAC, RIF and associated port are added to the source route database as indicated in logic block 504. Otherwise, the age of the entry corresponding to the given source MAC/RIF in the source route database is refreshed in logic block 508, and processing exits in logic block 510 causing a return to decision block 316 in FIG. 3.

Figure 6:
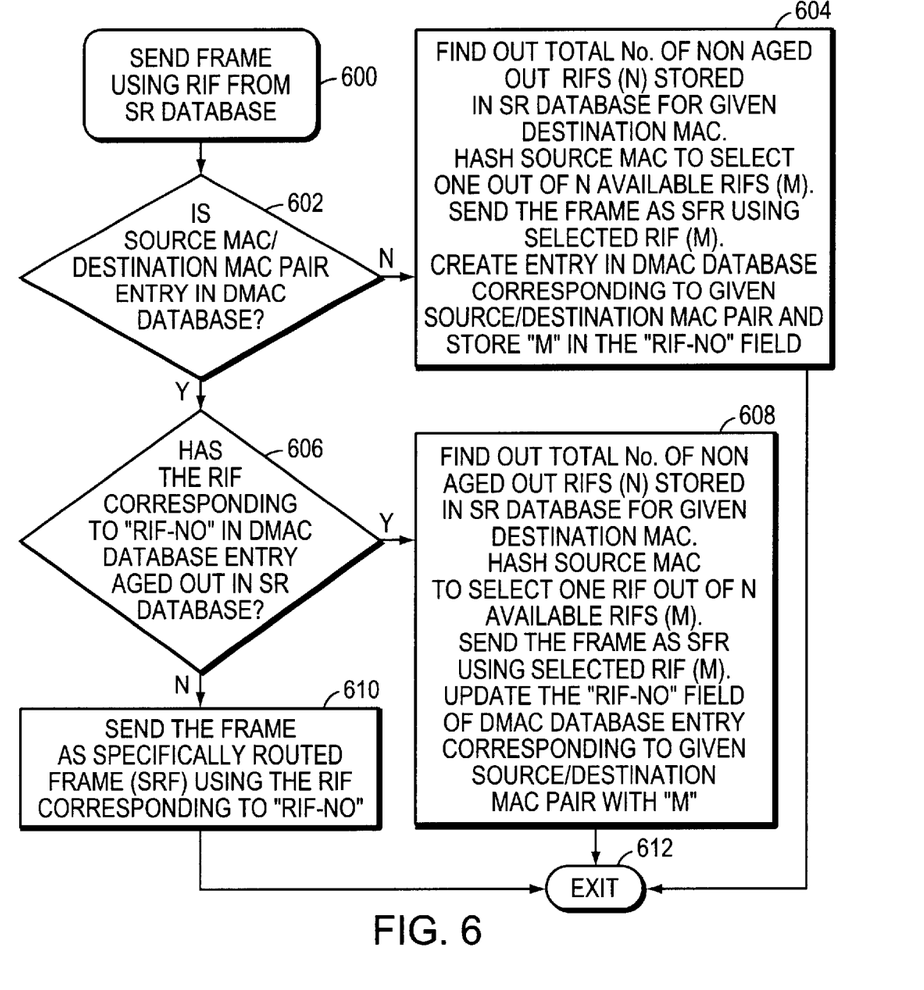
FIG. 6 illustrates the logic steps performed by the source routing-transparent (translational) bridge to send a frame using the routing information field (RIF) from the source route database.

FIG. 6 illustrates the processing performed by the translational bridge to send a frame using the routing information field from the source route database. Logic block 600 indicates the start of the process. In decision block 602, a test is performed to determine if the source MAC address/ destination MAC address pair exists in the duplicate MAC (DMAC) database. If it does not, then in logic block 604, the following steps are performed: (1) determine the total number of non-aged out RIFs(N) stored in the source route database for a given destination MAC address; (2) hash the source MAC address to select one out of N available RIFs (e.g., RIF(M)); (3) send the frame as a specifically routed frame using the selected RIF(M); (4) create an entry in the DMAC database corresponding to the given source MAC/ destination MAC pair, and store "M" in the corresponding "rif_no" field. Processing exits in logic block 612 and returns to step 300 in FIG. 3 to await the arrival of another frame.

If in decision block 602, an entry is found for the source MAC/destination MAC pair in the DMAC database, then in decision block 606, a test is made to determine if the RIF corresponding to "rif_no" in the DMAC database entry has aged out in the source route database. If it has not aged out, then the frame is sent as a specifically routed frame (SRF) using the RIF corresponding to the "rif_no", as indicated in logic block 610. Processing then exits in logic block 612.

If in decision block 606, the RIF corresponding to "rif_ no" in the DMAC database entry has aged out in the source route database, then in logic block 608, the following steps are performed: (1) determine the total number of non-aged out RIFs stored in the source route database for a given destination MAC; (2) hash the source MAC address to select one out of N available RIFs (e.g., RIF(M)); (3) send the frame as a specifically routed frame using the selected RIF(M); (4) update the "rif_no" field of the DMAC database entry corresponding to the given source MAC/ destination MAC pair with "M". Processing then exits in logic block 612.

Figure 7:
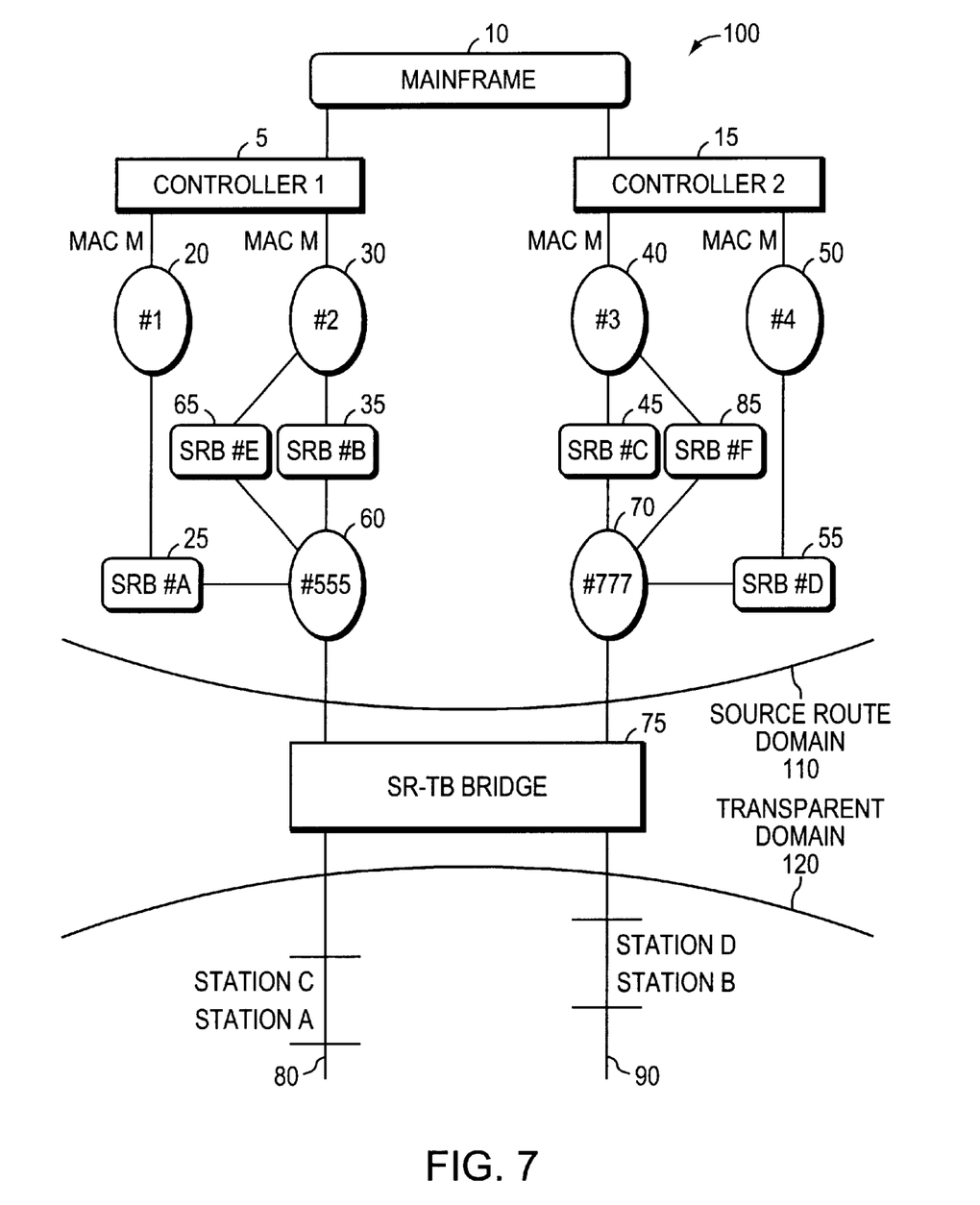
FIG. 7 illustrates another example of a source routing-transparent (translational) bridge network in which the present invention operates.

There are some optimizations that can be made to reduce the memory requirements in the translational bridge 75. Instead of caching all RIFs for a duplicate MAC destination address, only RIFs that end in a different ring number might be cached. This allows traffic to a MAC address to be distributed across multiple instances of the MAC address, but not be distributed across multiple paths to the same MAC address instance. To illustrate this point, FIG. 7 shows another example of a source route translational bridge network in which source route bridges 65 and 85 have been added to the network of FIG. 1. SRB 65 connects token ring LANs 30 and 60 to the same MAC instance (MAC M) to controller 5 as does the parallel path in which SRB 35 joins token ring LANs 30 and 60. The same is true of SRB 85 which connects token ring LANs 40 and 70 to the same MAC instance (MAC M) to controller 15 as does the parallel path in which SRB 45 joins token ring LANs 40 and 70. When translational bridge 75 sends explorer frames to the duplicate MAC address (MAC M), the STE frame will arrive at a specific MAC instance along one of the parallel paths depicted in FIG. 7 where there is an alternate path to the same MAC instance. Controllers 5 and 15, however, respond by sending an all paths explorer response frame. Thus in the context of FIG. 7, two additional RIFs will be received in the responses sent back to the translational bridge:

RIF-5: Ring #2, SRB#B, Ring #60
RIF-6: Ring #3, SRB#C, Ring #70
Since both RIF-2 and RIF-5 end in Ring #2, only one RIF would be entered into the translational bridge cache. Similarly, only one of RIF-3 and RIF-6 would be entered in this cache, since both RIFs end in Ring #3. To further reduce memory requirements, the number of destination MAC addresses for which multiple instances (i.e, duplicate MAC addresses) are supported can be limited. Also, it should be pointed out that the hashing algorithm described herein to distribute traffic from transparently bridged clients to different RIFs, means that stations, such as station A and station C both connected to the same LAN segment 80 can be routed along different RIFs to the same destination MAC address (MAC M). The same is true for stations B and D on LAN segment 90.

The source routing transparent bridging function of this invention can be implemented in various internetworking devices including actual translational bridge devices such as the IBM 8229 bridge, or in multiprotocol devices such as the IBM 2210 Nways Multiprotocol Router, the IBM 2216 Nways Multiaccess Connector, the IBM 8210 Nways Multiprotocol Switched Services (MSS) Server. The latter device is an IBM developed technology that implements multiprotocol, distributed routing in switched networks. It provides standards-based transparent bridging support between Ethernet emulated LANs and standards-based source route bridging support between token ring emulated LANs. Although the invention was described in the context of legacy physical Ethernet and token ring LANS. It is equally applicable to virtual LANs or emulated LANs (e.g., ATM-compliant LAN emulation) as well as to wide area network links including frame relay.

It is important to note that although the present invention has been described in the context of a translational bridge function installed on and executed by an internetworking device within a computer network, those skilled in the art will recognize and appreciate that the mechanisms of the present invention are capable of being distributed as a program product in a variety of forms, and that the present invention applies equally regardless of the particular type of signal bearing media utilized to carry out the distribution. Examples of signal bearing media include, without limitation, recordable type media such as CD ROMS. or floppy disks, and transmission type media such as analog or digital communications links.

While the invention has been particularly shown and described with reference to particular embodiments thereof, it will be understood by those skilled in the art that various changes in form and detail may be made without departing from the spirit or scope of the present invention.

Having thus described our invention, what we claim and desire to secure as Letters Patent is as follows:

1. A method for distributing data frames from source hosts in a transparent bridging domain over multiple communication paths to multiple instances of a destination address in a source route bridging domain of a heterogeneous computer network, said method implemented in an internetworking device comprising the steps of:

receiving a data frame at the internetworking device that is destined to a host in the source route bridging domain from a host in the transparent bridging domain;

sending an explorer frame out each source routed port to said destination address in the source route bridging domain if said destination address has not previously been learned by said internetworking device;

receiving a response to said explorer frame from each instance of the destination address in the source route bridging domain;

learning and storing in a cache at said internetworking device, the routing information contained in each said received response;

selecting a path to the destination address in the source route bridging domain for all data frames originating at said source host; and forwarding said data frame over said selected path to the destination address.

2. The method of claim 1 further comprising:

determining if the data frame is source routed;

if said data frame is source routed, determining if source routing is enabled on said incoming port;

learning the source address and routing information contained in said data frame:

determining if said data frame is an explorer frame; and if said data frame is an explorer frame, forwarding said data frame without said routing information to all ports that are transparently bridged, and forwarding said data frame with updated routing information to all ports that are source routed except the incoming port.

3. The method of claim 2 further comprising:

if said data frame is not source routed, updating a transparent bridge database with the source address contained in said data frame;

determining if the destination address is in said transparent bridge database;

if said destination address is in said transparent bridge database, forwarding said data frame to the port associated with said destination address;

if the destination address is not in said transparent bridge database, determining if the destination address is in a source routing database; and if the destination address is not in said source routing database, forwarding said data frame to all ports that are transparently bridged except the incoming port, and forwarding said data frame to all ports that are source routed as an explorer frame.

4. The method of claim 2 wherein said learning the source address and routing information step includes:

determining if there is an entry for said source address in a source routing database;

if there is no said entry, adding the source address, routing information and associated port to said source routing database;

for each entry for said source address, determining if the routing information in said data frame matches the routing information in said each entry;

if there is a matching entry, refreshing the age of said matching entry; and if there is no matching entry, adding the source address, routing information and associated port to said source routing database.

5. The method of claim 2 further comprising:

determining if the source address and destination address pair is in a duplicate destination address database;

if said source address and destination address pair is in said duplicate destination address database, determining if the corresponding routing information in a source routing database has aged out;

if said corresponding routing information in said source routing database has not aged out, sending said data frame as a specifically routed frame.

6. The method of claim 5 further including:

if said source address and destination address pair is not in said duplicate destination address database, determining the total number of non-aged out entries in said source routing database corresponding to said destination address;

hashing the source address in said data frame to select one of said non-aged out entries in said source routing database for forwarding said data frame as a specifically routed frame; and creating an entry in said duplicate destination address database corresponding to said source address and destination address pair.

7. The method of claim 5 further comprising:

if said corresponding entry in said source routing database has aged out, determining the total number of non-aged out entries in said source routing database corresponding to said destination address;

hashing the source address in said data frame to select one of said non-aged out entries in said source routing database for forwarding said data frame as a specifically routed frame.

8. The method of claim 1 wherein said internetworking device is a bridge.

9. The method of claim 1 wherein said internetworking device is a router with bridging software.

10. The method of claim 1 wherein said internetworking device is a server with bridging software.

11. The method of claim 1 wherein said explorer frame is a spanning tree explorer frame.

12. An internetworking device for distributing data frames from source hosts in a transparent bridging domain over multiple communication paths to multiple instances of a destination address in a source route bridging domain of a heterogeneous computer network, said internetworking device comprising:

means for receiving a data frame at the internetworking device that is destined to a host in the source route bridging domain from a host in the transparent bridging domain;

means for sending an explorer frame out each source routed port to said destination address in the source route bridging domain if said destination address has not previously been learned by said internetworking device;

means for receiving a response to said explorer frame from each instance of the destination address in the source route bridging domain;

means for learning and storing in a cache at said internetworking device, the routing information contained in each said received response;

means for selecting a path to the destination address in the source route bridging domain for all data frames originating at said source host; and means for forwarding said data frame over said selected path to the destination address.

13. The internetworking device of claim 12 further comprising:

means for determining if the data frame is source routed;

if said data frame is source routed, means for determining if source routing is enabled on said incoming port;

means for learning the source address and routing information contained in said data frame:

means for determining if said data frame is an explorer frame; and if said data frame is an explorer frame, means for forwarding said data frame without said routing information to all ports that are transparently bridged, and means for forwarding said data frame with updated routing information to all ports that are source routed except the incoming port.

14. The internetworking device of claim 13 further comprising:

if said data frame is not source routed, means for updating a transparent bridge database with the source address contained in said data frame;

means for determining if the destination address is in said transparent bridge database;

if said destination address is in said transparent bridge database, means for forwarding said data frame to the port associated with said destination address;

if the destination address is not in said transparent bridge database, means for determining if the destination address is in a source routing database; and if the destination address is not in said source routing database, means for forwarding said data frame to all ports that are transparently bridged except the incoming port, and means for forwarding said data frame to all ports that are source routed as an explorer frame.

15. The internetworking device of claim 12 wherein said means for learning the source address and routing information includes:

means for determining if there is an entry for said source address in a source routing database;

if there is no said entry, means for adding the source address, routing information and associated port to said source routing database;

for each entry for said source address,:means for determining if the routing information in said data frame matches the routing information in said each entry;

if there is a matching entry, means for refreshing the age of said matching entry; and if there is no matching entry, means for adding the source address, routing information and associated port to said source routing database.

16. The internetworking device of claim 12 further comprising:

means for determining if the source address and destination address pair is in a duplicate destination address database;

if said source address and destination address pair is in said duplicate destination address database, means for determining if the corresponding routing information in a source routing database has aged out;

if said corresponding routing information in said source routing database has not aged out, means for sending said data frame as a specifically routed frame.

17. The internetworking device of claim 16 further including:

if said source address and destination address pair is not in said duplicate destination address database, means for determining the total number of non-aged out entries in said source routing database corresponding to said destination address;

means for hashing the source address in said data frame to select one of said non-aged out entries in said source routing database for forwarding said data frame as a specifically routed frame; and means for creating an entry in said duplicate destination address database corresponding to said source address and destination address pair.

18. The internetworking device of claim 16 further comprising:

if said corresponding entry in said source routing database has aged out, means for determining the total number of non-aged out entries in said source routing database corresponding to said destination address;

means for hashing the source address in said data frame to select one of said non-aged out entries in said source routing database for forwarding said data frame as a specifically routed frame.

19. A computer program product for distributing data frames from source hosts in a transparent bridging domain over multiple communication paths to multiple instances of a destination address in a source route bridging domain of a heterogeneous computer network, said computer program product comprising:

program code for determining that a received data frame at an internetworking device is destined to a host in the source route bridging domain from a host in the transparent bridging domain;

program code for sending an explorer frame out each source routed port to said destination address in the source route bridging domain if said destination address has not previously been learned by said internetworking device;

program code for determining that a response to said explorer frame is received from each instance of the destination address in the source route bridging domain;

program code for learning and storing in a cache at said internetworking device, the routing information contained in each said received response;

program code for selecting a path to the destination address in the source route bridging domain for all data frames originating at said source host; and program code for forwarding said data frame over said selected path to the destination address.

20. The computer program product of claim 19 further comprising:

program code for determining if the data frame is source routed;

if said data frame is source routed, program code for determining if source routing is enabled on said incoming port;

program code for learning the source address and routing information contained in said data frame:

program code for determining if said data frame is an explorer frame; and if said data frame is an explorer frame, program code for forwarding said data frame without said routing information to all ports that are transparently bridged, and program code for forwarding said data frame with updated routing information to all ports that are source routed except the incoming port.

21. The computer program product of claim 20 further comprising:

if said data frame is not source routed, program code for updating a transparent bridge database with the source address contained in said data frame;

program code for determining if the destination address is in said transparent bridge database;

if said destination address is in said transparent bridge database, program code for forwarding said data frame to the port associated with said destination address;

if the destination address is not in said transparent bridge database, program code for determining if the destination address is in a source routing database; and if the destination address is not in said source routing database, program code for forwarding said data frame to all ports that are transparently bridged except the incoming port, and program code for forwarding said data frame to all ports that are source routed as an explorer frame.

22. The computer program product of claim 20 wherein said program code for learning the source address and routing information includes:

program code for determining if there is an entry for said source address in a source routing database;

if there is no said entry, program code for adding the source address, routing information and associated port to said source routing database;

for each entry for said source address, program code for determining if the routing information in said data frame matches the routing information in said each entry; and if there is no matching entry, program code for adding the source address, routing information and associated port to said source routing database;

if there is a matching entry, program code for refreshing the age of said matching entry.

23. The computer program product of claim 20 further comprising:

program code for determining if the source address and destination address pair is in a duplicate destination address database;

if said source address and destination address pair is in said duplicate destination address database, program code for determining if the corresponding routing information in a source routing database has aged out;

if said corresponding routing information in said source routing database has not aged out, program code for sending said data frame as a specifically routed frame.

24. The computer program product of claim 23 further including:

if said source address and destination address pair is not in said duplicate destination address database, program code for determining the total number of non-aged out entries in said source routing database corresponding to said destination address;

program code for hashing the source address in said data frame to select one of said non-aged out entries in said source routing database for forwarding said data frame as a specifically routed frame; and program code for creating an entry in said duplicate destination address database corresponding to said source address and destination address pair.

25. The computer program product of claim 23 further comprising:

if said corresponding entry in said source routing database has aged out, program code for determining the total number of non-aged out entries in said source routing database corresponding to said destination address;

program code for hashing the source address in said data frame to select one of said non-aged out entries in said source routing database for forwarding said data frame as a specifically routed frame.

26. A translational bridge for distributing data frames from source hosts in a transparent bridging domain over multiple communication paths to multiple instances of a destination address in a source route bridging domain of a heterogeneous computer network, said translational bridge comprising:

a plurality of interfaces for transmitting and receiving data frames to and from hosts on network segments connected to said translational bridge with a plurality of network segments operating in said source route bridging domain and at least one network segment operating in said transparent bridging domain;

a processor connected to said plurality of interfaces for:
   receiving a data frame that is destined to a host in the source route bridging domain from a host in the transparent bridging domain;
   sending an explorer frame out each source routed interface to said destination address in the source route bridging domain if said destination address has not previously been learned;
   receiving a response to said explorer frame from each instance of the destination address in the source route bridging domain;
   learning the routing information contained in each said received response;
   selecting a path to the destination address in the source route bridging domain for all data frames originating at said source host; and
   forwarding said data frame over said selected path to the destination address.

27. The translational bridge of claim 26 further comprising a memory coupled to said processor for storing said routing information contained in each said received response.

28. The translational bridge of claim 26 wherein said plurality of network segments operating in the source route bridging domain comprise token ring local area networks.

29. The translational bridge of claim 26 wherein said at least one network segment operating in said transparent bridging domain comprises an Ethernet local area network.

* * * * *